United States Patent
Bornkessel et al.

(10) Patent No.: US 6,996,985 B2
(45) Date of Patent: Feb. 14, 2006

(54) EXPANSION RESERVOIR FOR A MASTER CYLINDER OF A HYDRAULIC FORCE TRANSMISSION SYSTEM

(75) Inventors: Diethard Bornkessel, Ermershausen (DE); Rainer Leuschke, Rentweinsdorf (DE); Elliott Scott, Novi, MI (US)

(73) Assignee: FTE Automotive GmbH & Co. KG, Ebern (DE)

( * ) Notice: Subject to any disclaimer, the term of this patent is extended or adjusted under 35 U.S.C. 154(b) by 197 days.

(21) Appl. No.: 10/411,078

(22) Filed: Apr. 10, 2003

(65) Prior Publication Data

US 2004/0035109 A1  Feb. 26, 2004

(30) Foreign Application Priority Data

Apr. 13, 2002  (DE) ................ 102 16 362

(51) Int. Cl.
*F15B 1/26* (2006.01)
(52) U.S. Cl. .......................... 60/585; 60/592
(58) Field of Classification Search ................ 60/584, 60/585, 592
See application file for complete search history.

(56) References Cited

U.S. PATENT DOCUMENTS

| | | | |
|---|---|---|---|
| 3,213,626 A * | 10/1965 | Shutt et al. .................. 60/585 |
| 3,403,517 A | 10/1968 | Lewis ......................... 60/54.6 |
| 3,479,068 A * | 11/1969 | Brittain ........................ 60/585 |
| 3,583,160 A * | 6/1971 | Nakamura .................... 60/584 |
| 4,307,815 A * | 12/1981 | Sakazume ..................... 60/585 |
| 4,503,678 A * | 3/1985 | Wimbush ..................... 60/585 |
| 5,025,628 A * | 6/1991 | Layman et al. ............... 60/585 |
| 6,434,935 B1 * | 8/2002 | Rammhofer et al. .......... 60/585 |

* cited by examiner

Primary Examiner—Thomas E. Lazo
(74) *Attorney, Agent, or Firm*—McAndrews Held & Malloy Ltd.

(57) ABSTRACT

An expansion reservoir is disclosed, which has a fluid chamber defined by a reservoir bottom and a flexible reservoir top movable relative to the reservoir bottom as a function of the reservoir filling level, wherein a hydraulic connection to a master cylinder is provided at the reservoir bottom while the reservoir top comprises a substantially liquid-tight but air-permeable connection to the atmosphere, in order to allow pressure compensation between an air volume left in the filled fluid chamber and the atmosphere. The hydraulic connection to the master cylinder comprises an extension protruding into the fluid chamber, which extension defines a predetermined volume V in the fluid chamber which is larger than the air volume left in the filled fluid chamber. In addition thereto, the reservoir top may take the form of a rolling lobe bellows, which comprises a plurality of wall portions substantially concentric at least in the undeformed state.

22 Claims, 2 Drawing Sheets

EXPANSION RESERVOIR FOR A MASTER CYLINDER OF A HYDRAULIC FORCE TRANSMISSION SYSTEM

BACKGROUND OF THE INVENTION

The present invention relates to an expansion reservoir for a master cylinder of a hydraulic force transmission system. In particular, the invention relates to an expansion reservoir for a master cylinder of a hydraulic clutch control or brake system, as used in huge numbers in the automotive industry.

DESCRIPTION OF THE PRIOR ART

In a hydraulic brake system, the main brake cylinder constitutes the master cylinder, with which the expansion or compensating reservoir serving as a storage chamber for the brake fluid is so connected that, when the main brake cylinder is in the unactuated state, a fluid exchange may take place both with the primary or pressure chamber thereof via a pressure compensating port and with the secondary or expansion chamber, separated from the pressure chamber by means of the so-called primary lip seal, via an expansion port but, in the actuated state, only with the expansion chamber, after the primary lip seal has travelled past the pressure compensating port.

More precisely, when the main brake cylinder piston is in the idle position, the possibility of pressure compensation must be ensured, so that a change in the temperature of the brake fluid, when the brake is in the unactuated state, does not lead to a pressure change in the brake system and so that, subsequent to draw-down processes, the pressure in the main brake cylinder always falls to ambient pressure.

This generally takes place through opening of a connection between the main brake cylinder pressure chamber and the expansion reservoir. This atmospherically vented reservoir contains the brake fluid which is needed in order always to be able reliably to feed into the brake system the top-up volume required in the brake system as a result for example of wear to the brake linings, for which reason such reservoirs are also known as compensating reservoirs. In addition, it supplies the volume briefly required by the brake system in the event of a "draw-down process" and readmits the draw-down volume as it flows back. Such a draw-down process occurs every time the main brake cylinder piston returns to its idle position more quickly than the pistons of the wheel brake actuating cylinders. If these then force the volume required to apply the brakes back to the main brake cylinder, said volume flows through the pressure compensating port, which has been reopened in the meantime, into the expansion reservoir. Moreover, the expansion reservoir ensures compensation of possible volume fluctuations in the hydraulic brake system, which may occur in the event of ABS (antilock braking system) or ASR (traction control) functions. Finally, the expansion reservoir, arranged as a rule at the highest point of the hydraulic brake system installed in the motor vehicle, also serves to bleed the brake system.

The same applies to a hydraulic clutch control, in which the main brake cylinder and the wheel brake actuating cylinders are replaced respectively by the clutch master cylinder and the clutch slave cylinder. Fluctuations in the volume of hydraulic fluid, to be compensated by the expansion reservoir, may occur here for example in the case of rapid clutching sequences for the clutch engaging or disengaging process, in particular in the case of automated clutch operation, or be caused by clutch wear or temperature variations in the system.

In this context, the generic DE-A-100 38 982 discloses a fluid reservoir for a pressure medium for a hydraulic system, such as brake or clutch device, which comprises an inner chamber for the pressure medium. This inner chamber is defined (inter alia) by the fixed bottom of a reservoir housing and a flexible reservoir top, which takes the form of a concertina-like bellows attached to the reservoir housing by means of a rear-vented cover and may be moved towards the bottom or away therefrom as a function of the filling level of the reservoir. At or in the vicinity of the bottom there is provided a line or connection to the hydraulic system. The flexible reservoir top formed by the concertina-like bellows finally has a substantially liquid-tight but air-permeable connection to the atmosphere, which is formed by a gas-permeable membrane or a valve with a closable slot and serves to allow pressure compensation between an air volume left in the inner chamber when the hydraulic system is in the filled state and the atmosphere.

This fluid reservoir construction has proven advantageous insofar as, compared with previously known solutions in which an air-permeable connection to the atmosphere is established solely by a seal labyrinth provided in a fixed reservoir top, the risk no longer exists of the seal labyrinth becoming clogged or allowing the introduction of a relatively large amount of dirt or water. Compared with other previously known solutions, in which, to protect against the introduction of dirt and/or water, a substantially air-impermeable elastomeric membrane sealed relative to the fluid reservoir or a continuous concertina-like bellows is used, which may adjust to the pressure medium level as a result of its resilient deformability and is intended to prevent a vacuum, the advantage consists in the fact that any excess air present or forming in the hydraulic system may be discharged to the outside and does not act as an air spring exerting an undesirable influence on the pressure of the pressure medium.

Nevertheless, the fluid reservoir proposed in DE-A-100 38 982 is still in need of functional improvement.

In the modern automotive industry it is conventional to anchor the motor vehicle to a rotary stand for final assembly, so that the motor vehicle may as a rule be rotated by 180° about its longitudinal axis. In this way, for example, it is simpler to fit underbodies, because overhead assembly positions may be avoided, or to bring the motor vehicle into a defined position relative to a welding robot, for instance. During this final assembly, the motor vehicle is also rotated with filled hydraulic systems, e.g. a filled hydraulic brake system and/or clutch control. There is then a risk that the air deliberately left in the inner chamber of the fluid reservoir will migrate via the connection to the hydraulic system into the main brake cylinder or clutch master cylinder, thereby impairing functioning when the hydraulic system is operated.

A further problem consists in the fact that the concertina-like bellows in the fluid reservoir may possibly dip into the brake or hydraulic fluid contained in the fluid reservoir if the hydraulic system is actuated very quickly and the filling level of the fluid reservoir therefore changes rapidly. There is a degree of probability that the gas-permeable membrane or the valve with the closable slot on the concertina-like bellows will then become wet with the brake or hydraulic fluid in such a way that problem-free pressure compensation between the inner chamber of the fluid reservoir and the atmosphere is no longer guaranteed. This too may impair functioning when the hydraulic system is in operation.

Finally, DE-A-24 40 000 discloses an oil tank, in particular for hydrostatic steering systems for motor vehicles, consisting of a tank bowl with a cover, an annular-cylindrical covered filter cartridge, an inlet line discharging inside the filter cartridge and an outlet line discharging outside the filter cartridge into the inside of the tank bowl. In this prior art, a recirculating device activatable by a slight vacuum in the inlet line is arranged at the inlet line in the vicinity of the lowest point of the tank bowl between the bottom of the tank bowl and the lower cover of the filter cartridge and a non-return valve opening in the direction of the interior of the filter cartridge is arranged between the recirculating device and the interior of the filter cartridge. This arrangement is intended to make available a quantity of oil required for reliable steerability of the motor vehicle, in the event of an oil loss from the hydrostatic steering system.

SUMMARY OF THE INVENTION

Taking the prior art according to DE-A-100 38 982 as basis, the object of the invention is to provide an expansion reservoir for a master cylinder of a hydraulic force transmission system which displays the advantages of an expansion reservoir having a flexible reservoir top provided with a substantially liquid-tight but air-permeable connection but avoids the functional impairment during operation of the hydraulic system associated therewith in the prior art.

According to the invention, in the case of an expansion reservoir for a master cylinder of a hydraulic force transmission system, in particular a hydraulic clutch control or brake system, having a fluid chamber defined by a reservoir bottom and a flexible reservoir top which may be moved towards the reservoir bottom or away therefrom as a function of the filling level of the reservoir, wherein a hydraulic connection to the master cylinder is provided at the reservoir bottom while the reservoir top comprises a substantially liquid-tight but air-permeable connection to the atmosphere in order to allow pressure compensation between an air volume left in the fluid chamber when the transmission system is in the filled state and the atmosphere, the hydraulic connection to the master cylinder comprises an extension protruding into the fluid chamber, which extension defines a predetermined volume in the fluid chamber which is larger than the volume of air left in the fluid chamber when the transmission system is in the filled state.

Due to this extremely simple, low-cost configuration of the expansion reservoir, the hydraulic force transmission system filled with hydraulic fluid may, when fitted in the motor vehicle, be rotated together with the motor vehicle by 180° on a rotary stand, without the risk arising of the volume of air left in the fluid chamber, which remains substantially constant irrespective of the state of actuation of the hydraulic force transmission system as a result of combining a flexible reservoir top with a substantially liquid-tight but air-permeable connection to the atmosphere, or some of this volume of air passing via the master cylinder into the hydraulic force transmission system. In the event of rotation of the expansion reservoir, the volume of air left in the fluid chamber of the expansion reservoir namely travels along the reservoir walls to the reservoir bottom in accordance with physical principles and cannot pass from there to the master cylinder via the hydraulic connection because the extension of the hydraulic connection protrudes in defined manner into the fluid chamber and thus prevents this from happening. Instead, the volume of air left in the fluid chamber of the expansion reservoir is trapped or collected completely in the predetermined volume defined in the fluid chamber by the extension of the hydraulic connection.

The extension of the hydraulic connection may be provided substantially centrally on the reservoir bottom. With this configuration it is reliably ensured, whatever the angle of rotation of the expansion reservoir (for instance even in the case of rotation by only 90° about a transverse axis of the expansion reservoir from the position of installation and service), that no air whatsoever can pass into the hydraulic force transmission system via the hydraulic connection to the master cylinder.

According to a further development which is particularly advantageous with regard to manufacture, the extension of the hydraulic connection may be tubular. The extension of the hydraulic connection may be made in one piece with the reservoir bottom, and this is conducive to simple, low-cost manufacture of the expansion reservoir, in particular if said parts are injection-molded from plastics material.

As an alternative, it is possible for the extension of the hydraulic connection to be made of a small tube insertable into the reservoir bottom. It is thus possible, if necessary, to vary the length of the small tube as an interchangeable or plug-in part, in order thereby to allow volumes of air of different sizes to be enclosed in the fluid chamber of the expansion reservoir.

The flexible reservoir top may take the form of a rolling lobe bellows, which comprises a plurality of wall portions substantially concentric at least in the undeformed state, i.e. telescoping into one another.

In comparison to the concertina-type bellows known in the prior art with regard to expansion reservoirs, such a rolling lobe bellows has less rigidity or expansion force to be overcome in the axial direction, which allows the reservoir top to respond more quickly to a change in reservoir filling level. In particular, the reservoir top may thus escape the hydraulic fluid in the event of a rapidly rising reservoir filling level, without the risk arising of the substantially liquid-tight but air-permeable connection to the atmosphere, which may for example be a gas-permeable membrane or a valve with a closable slot, being made at all or excessively wet by the hydraulic fluid, such that the valve function is not impaired in this case.

Use of a rolling lobe bellows has the further advantage that the reservoir top exhibits a larger stroke capacity than the known concertina-type bellows solution while occupying the same amount of space. This allows the expansion reservoir according to the invention to be used with hydraulic clutch controls for so-called SAC clutches, in which, due to the lack of wear compensation, the filling level in the expansion reservoir reduces as clutch wear increases. The reservoir top formed by the rolling lobe bellows may follow the reducing filling level, such that no undesired vacuum arises in the fluid chamber, which vacuum would be established if a concertina-type bellows were used which could not follow the reducing filling level.

A further advantage of the rolling lobe bellows is finally that it exhibits greater fatigue strength/less bending stress at the thin-walled upright wall portions than a concertina-type bellows.

According to a further feature, when the reservoir top moves towards the reservoir bottom or away therefrom, the rolling lobe bellows rolls in a defined way over a cylindrical side wall of the expansion reservoir and is thus provided with additional support, so allowing the rolling lobe bellows walls to be very thin, which in turn makes for easy axial movability of the reservoir top.

In an expedient further development, the rolling lobe bellows may comprise an annular fastening flange, which is gripped between a side wall of the expansion reservoir and a cover attached detachably to the expansion reservoir. The fastening flange is advantageously provided with two annular, concentric sealing beads, wherein the inner sealing bead has a diameter which is smaller than an average diameter of the side wall of the expansion reservoir, while the outer sealing bead has a diameter which is larger than the average diameter of the side wall. Preferably, these sealing beads are provided, on the side of the fastening flange remote from the reservoir bottom. As a result, the sealing beads on the rolling lobe bellows fastening flange clamped against the side wall of the expansion reservoir by means of the cover interact with the side wall in such a way that a reliably tight connection is provided at this point and there is no risk, not even if the side wall is wet with hydraulic fluid, of the rolling lobe bellows coming loose, i.e. of the rolling lobe bellows flange being pulled out from between the side wall of the expansion reservoir and the cover in the event of deformation of the rolling lobe bellows.

The rolling lobe bellows may have three resiliently interconnected wall portions, wherein the inner two wall portions exhibit a wall thickness which is smaller than the wall thickness of the outer wall portion, such that, in the event of movement of the reservoir top following the filling level in the expansion reservoir, deformation of the rolling lobe bellows advantageously takes place primarily at the inner two wall portions, while the outer wall portion centers the rolling lobe bellows in the expansion reservoir.

The rolling lobe bellows appropriately has a base portion extending substantially perpendicularly to the wall portions thereof and preferably for the most part forming the reservoir top, which base portion comprises a central opening into which a valve element is detachably hooked which serves in providing the substantially liquid-tight but air-permeable connection to the atmosphere.

Finally, it is possible, in principle, for the expansion reservoir to be constructed in one piece with a housing of the master cylinder. However, it is preferable for the expansion reservoir to be constructed separately from the housing of the master cylinder, wherein the expansion reservoir may be plugged together directly with the master cylinder or be connected with the master cylinder by means of a hose, thereby ensuring greater flexibility with regard to the possible fitting points of the expansion reservoir.

BRIEF DESCRIPTION OF THE DRAWINGS

The invention is explained in more detail below with reference to a preferred exemplary embodiment and to the attached, in part schematic drawings, in which.

DESCRIPTION OF THE PREFERRED EMBODIMENTS

Figure 1:
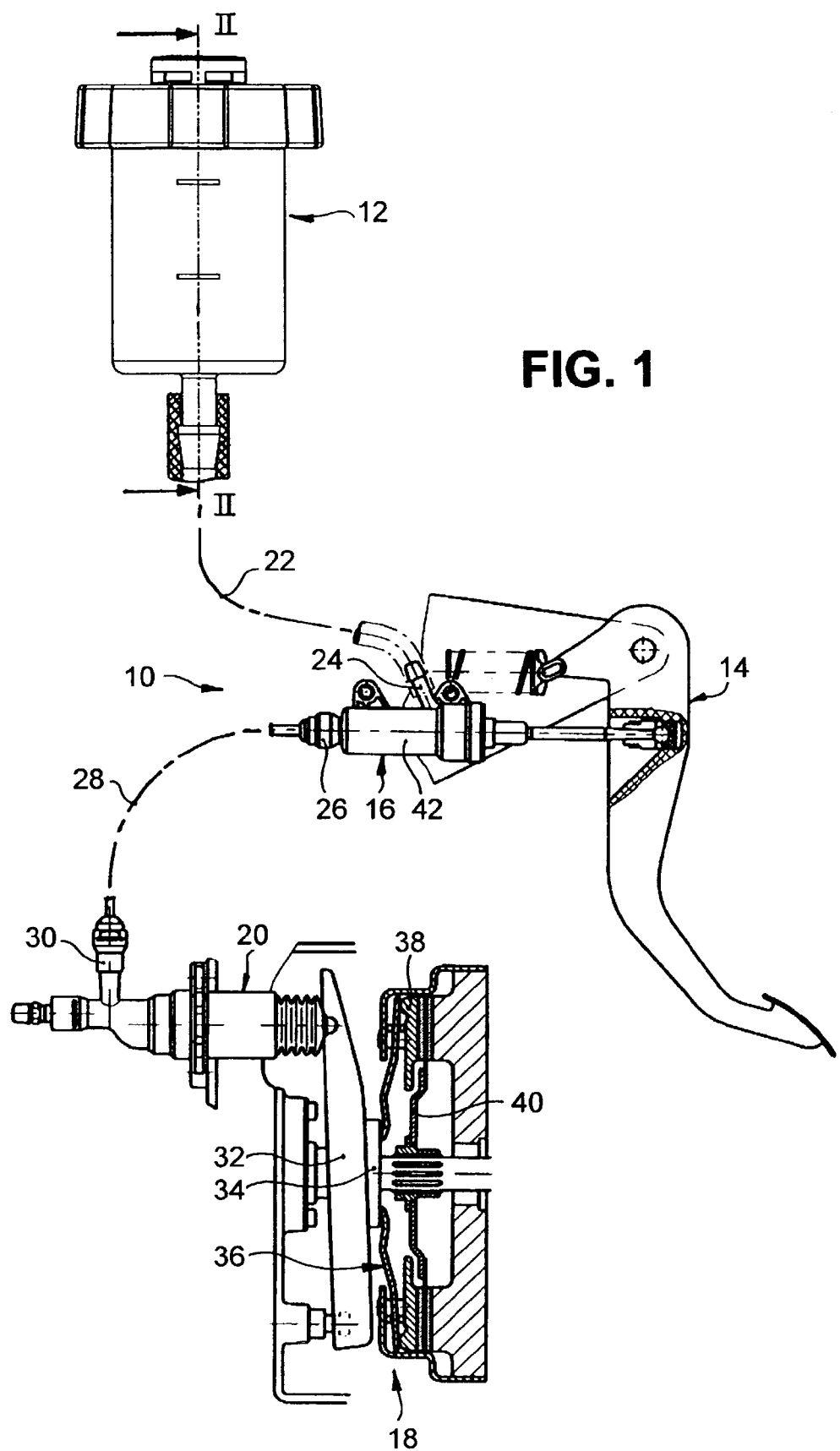
FIG. 1 is a schematic representation of a hydraulic clutch control with an expansion reservoir, as an example of a preferred point of use for the expansion reservoir.

FIG. 1 shows a hydraulic clutch control for a motor vehicle, designated overall as 10, as an example of a hydraulic force transmission system, whose hydraulic part comprises an expansion or compensating reservoir 12 filled with hydraulic fluid and described in more detail below with reference to FIG. 2, a clutch master cylinder 16 actively connected with a clutch pedal 14 and a clutch slave cylinder 20 actively connected with a clutch 18. The expansion reservoir 12 is connected by means of a hydraulic hose 22 to an expansion and pressure compensating connection 24 of the clutch master cylinder 16, whose pressure connection 26 is connected by means of a hydraulic line 28 to a pressure connection 30 of the clutch slave cylinder 20. All the components illustrated in FIG. 1, except for the expansion reservoir 12, are known per se and are therefore described only insofar as seems necessary for an understanding of the present invention.

With regard to the per se known functioning of the hydraulic clutch control 10, it will merely be noted at this point that the pressure generated in the clutch master cylinder 16 by depressing the clutch pedal 14 may be transmitted via the fluid column in the hydraulic line 28 to the clutch slave cylinder 20. The clutch slave cylinder 20 then applies an actuating force via a release fork 32 to a throwout bearing 34 of the clutch 18, in order to separate a clutch pressure plate 38 from a clutch disk 40 and thus the engine, not shown here, from the motor vehicle gears, likewise not shown here, via a release mechanism 36.

As already mentioned above, the clutch master cylinder 16 is so constructed, in a manner known per se, that, when the clutch master cylinder 16 is in the unactuated state, the expansion reservoir 12 may communicate hydraulically via the hydraulic hose 22 with (1) a primary or pressure chamber (not illustrated) of the clutch master cylinder 16 via a pressure compensating port (not illustrated) branching off from the expansion and pressure compensating connection 24 and (2) a secondary or expansion chamber (not illustrated) of the clutch master cylinder 16 separated from the pressure chamber by means of a primary lip seal (not illustrated) via an expansion port (not illustrated) likewise branching off from the expansion and pressure compensating connection 24. When the clutch master cylinder 16 is in the actuated state, only the hydraulic connection between the expansion reservoir 12 and the expansion chamber of the clutch master cylinder 16 remains, once the primary lip seal on the piston (not illustrated) displaced by means of the clutch pedal 14 has travelled past the pressure compensating port, so that a pressure may be built up in the pressure chamber of the clutch master cylinder 16 which is also applied to the clutch slave cylinder 20 via the hydraulic line 28. It is obvious that the expansion reservoir 12 may thus compensate variations in the volume of hydraulic fluid which may arise during clutch engagement or disengagement or be caused by clutch wear or temperature variations in the system.

Although, in the exemplary embodiment illustrated here, the expansion reservoir 12 is shown as a separate system component, which is connected with the clutch master cylinder 16 via the hydraulic hose 22, the expansion reservoir 12 could also be connected directly with the clutch master cylinder 16, e.g. pushed thereon, or be constructed in one piece with a housing 42 of the clutch master cylinder 16.

Figure 2:
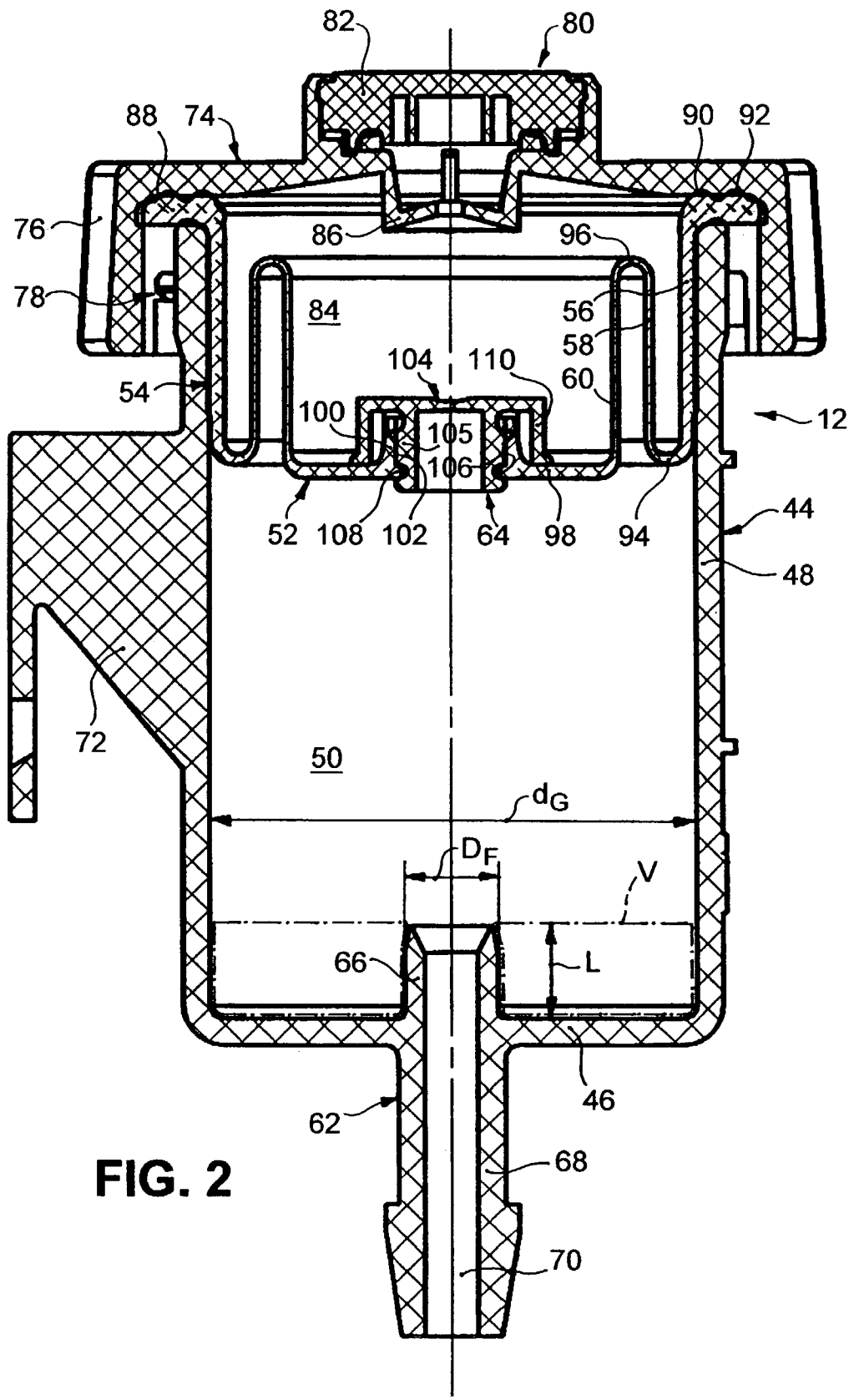
FIG. 2 is an enlarged sectional view of the expansion reservoir illustrated in FIG. 1 along section line II—II of FIG. 1.

FIG. 2 shows the expansion reservoir 12 in its position of use but in the unfilled state and not connected to the hydraulic clutch control 10. For simplicity's sake, FIG. 2 also shows all the resilient parts in the undeformed state.

According to FIG. 2, the expansion reservoir 12 has a substantially cup-shaped housing 44 preferably injection-molded from a plastics material such as polyamide and having a flat reservoir bottom 46 and a substantially annular-cylindrical side wall or reservoir wall 48 adjacent thereto. In the housing 44 there is located a substantially cylindrical fluid chamber 50, which is defined at the bottom by the reservoir bottom 46 and at the sides by the reservoir wall 48. At the top, the fluid chamber 50 is defined by a flexible reservoir top 52, which may move towards the reservoir bottom 46 or away therefrom as a function of the filling level of the reservoir and, according to an essential feature, takes the form of a rolling lobe bellows 54 attached to the housing 44. The rolling lobe bellows 54, described in more detail below and consisting of a resilient plastics material such as EPDM (abbreviation derived from ethylene-propylene-diene and polymethylene), has for this purpose a plurality of annular-cylindrical wall portions 56, 58, 60 substantially concentric at least in the undeformed state, i.e. telescoping into one another, and connected resiliently together. While a hydraulic connection 62 to the clutch master cylinder 16 is provided at the reservoir bottom 46, the flexible reservoir top 52 comprises a substantially liquid-tight but air-permeable connection 64 to the atmosphere, in order to allow pressure compensation between an air volume left in the fluid chamber 50 when the hydraulic clutch control 10 is in the filled state and the atmosphere. As likewise described in more detail below, the hydraulic connection 62 to the clutch master cylinder 16 comprises, according to another essential feature, an extension 66 protruding into the fluid chamber 50, which extension 66 defines a predetermined volume V in the fluid chamber 50 which is larger than the air volume left in the fluid chamber 50 when the hydraulic clutch control 10 is in the filled state and is indicated in FIG. 2 by a dash-dotted line.

It is immediately visible from FIG. 2 that the predetermined volume V is dependent on the external dimensions of the tubular extension 66 provided substantially centrally on the reservoir bottom and constructed in one piece therewith. More precisely, the predetermined (annular) volume V results, in the exemplary embodiment shown, from the following relationship:

$$V = \frac{L \cdot \pi}{4} \cdot (d_G^2 - D_F^2), \text{ wherein}$$

L=the length of the extension 66 protruding into the fluid chamber 50,
$d_G$=the internal diameter of the housing 44,
$D_F$=the external diameter of the extension 66 and
π=the circle constant.

The hydraulic connection 62 to the clutch master cylinder 16 additionally has a connector 68 projecting downwards from the housing 44, onto which connector 68 the hydraulic hose 22 to the clutch master cylinder 16 may be slipped in accordance with FIG. 1 and suitably attached. 70 designates a cylindrical through-hole, which extends through the connector 68, the reservoir bottom 46 and the extension 66.

Although, in the exemplary embodiment illustrated, the extension 66 is constructed in one piece with the reservoir bottom 46 and the connector 68, the extension may also take the form of a small tube (not illustrated) insertable into the reservoir bottom, thereby making it possible to vary the predetermined volume V in accordance with respective requirements by appropriate selection of the length of the small tube.

On the left-hand side of the expansion reservoir 12 in FIG. 2, a fastening flange 72 constructed in one piece with the housing 44 is also shown, by means of which flange 72 the expansion reservoir 12 may be fastened in the engine compartment of the motor vehicle. At the upper end in FIG. 2 of the housing 44 there is provided a substantially dish-shaped cover 74 preferably injection-molded from a plastics material such as polypropylene, which cover 74 comprises a suitably profiled handling portion 76 at its outer circumference and is attached detachably to the housing 44 by means of a bayonet catch 78 at its inner circumference. Alternatively, a screw connection could also be provided here; however, the bayonet catch 78 is preferred especially as it simplifies fitting.

The cover 74 is further provided centrally with a venting device 80, which comprises, at the top in FIG. 2, an insert portion 82 fixed appropriately to the cover 74. The insert portion 82 serves on the one hand to cover the venting device 80 at the top, so that no dirt can fall into the expansion reservoir 12. On the other hand, the insert portion 82 may be of a particular colour, for example, to indicate to which hydraulic force transmission system the expansion reservoir 12 belongs. The venting device 80 ensures that the space 84 in the expansion reservoir 12 located above the rolling lobe bellows 54 is always connected with the atmosphere, to which end there is provided a plurality of connection openings distributed uniformly about the circumference of the venting device 80, which openings are not visible in the section plane of the expansion reservoir 12 shown in FIG. 2. In order inter alia to prevent this connection from being closed to the atmosphere by the rolling lobe bellows 54, in the event of excessive upwards excursion thereof in FIG. 2, the venting device 80 centrally comprises a limit stop 86 for the rolling lobe bellows 54, which limit stop 86 projects into the space 84. The connection openings, not shown here, to the atmosphere open above the limit stop 86 in the space 84.

As is clearly visible in FIG. 2, the rolling lobe bellows 54 has an annular fastening flange 88, which, at the top in FIG. 2, is gripped between an annular surface at the end of the reservoir wall 48 of the housing 44 and the cover 74 attached detachably to the housing 44. On the side of the fastening flange 88 remote from the reservoir bottom 46 there are provided two concentric sealing beads 90, 92, annular when taken in plan view. The inner sealing bead 90 has a diameter, when viewed in a plane perpendicular to the central axis of the expansion reservoir 12, which is smaller than an average diameter of the reservoir wall 48, more precisely the annular surface at the end of the reservoir wall 48, while the outer sealing bead 92 here exhibits a diameter which is larger than the average diameter of the reservoir wall 48. The purpose of this design of fastening flange 88 is to provide the cover 74 with a tendency, when the cover 74 is being fitted tightly on the housing 44, to press the inner sealing bead 90 into the housing 44 and the outer sealing bead 92 over the housing 44. As a result, the sealing beads 90, 92 on the fastening flange 88 of the rolling lobe bellows 54 clamped against the wall 48 of the expansion reservoir 12 by means of the cover 74 interact with the reservoir wall 48 in such a way that a reliably tight connection is obtained at this point and there is no risk whatsoever of the rolling lobe bellows 54 coming loose from the housing 44, i.e. the fastening flange 88 of the rolling lobe bellows being pulled out from between the reservoir wall 48 and the cover 74 in the event of deformation of the rolling lobe bellows 54.

In the exemplary embodiment shown, the rolling lobe bellows 54 has three resiliently interconnected wall portions 56, 58 and 60. The outer wall portion 56 radially inwardly adjoining the fastening flange 88 exhibits an external diameter which corresponds substantially to the internal diameter $d_G$ of the housing 44, such that the outer wall portion 56 centres the rolling lobe bellows 54 relative to the housing 44. The outer wall portion 56 is adjoined via a lower roll bend 94 by the middle wall portion 58, which is in turn connected to the inner wall portion 60 via an upper roll bend 96. The graduation in diameter from outer wall portion 56 to middle wall portion 58 corresponds substantially to the graduation in diameter from middle wall portion 58 to inner wall portion 60. The thickness of the outer wall portion 56 is greater, however, than the then constant thickness of the central and inner wall portions 58, 60.

In FIG. 2, the bottom of the inner wall portion 60 of the rolling lobe bellows 54 is adjoined radially inwardly by a base portion 98 of the rolling lobe bellows 54 extending substantially perpendicularly to the wall portions 56, 58, 60, which base portion 98 has a central opening 102 defined by a substantially hollow-cylindrical end portion 100 of the rolling lobe bellows 54. A valve element 104 is hooked detachably into the central opening 102, which valve element 104 is a component of the substantially liquid-tight but air-permeable connection 64 to the atmosphere. For this purpose, an inner ring portion 105 of the valve element 104, preferably consisting of plastics material, is provided at the outer circumference with an encircling groove 106, in which an annular projection 108 protruding radially inwards from the end portion 100 of the rolling lobe bellows 54 engages in form-fitting manner, while an outer ring portion 110 of the valve element 104 is supported on the upper side, in FIG. 2, of the base portion 98 of the rolling lobe bellows 54.

Not shown in FIG. 2 are connection openings lying in a different section plane and distributed uniformly around the circumference of the outer ring portion 110 of the valve element 104, which connection openings connect the annular space between the inner ring portion 105 and the outer ring portion 110 of the valve element 104 constantly with the space 84 above the rolling lobe bellows 54. Also not shown, because they lie in a different section plane, are two slits, offset by 180°, formed in the outer circumference of the inner ring portion 105 of the valve element 104, which slits extend in the axial direction of the inner ring portion 105. When the filled expansion reservoir 12 is in the service position, the air left in the fluid chamber 50 is situated in these slits. If the pressure of the volume of air left in the fluid chamber 50 exceeds a predetermined pressure, the air located in the slits raises the end portion 100 of the rolling lobe bellows 54 slightly from the inner ring portion 105 of the valve element 104 in the manner of a slot valve, such that air may escape through the connection openings in the outer ring portion 110 into the space 84 above the rolling lobe bellows 54 and thence outwards via the venting device 80.

It is clear that the wall portions 58 and 60 of the rolling lobe bellows 54 may move telescopically relative to one another and to the outer wall portion 56, if the rolling lobe bellows 54 or the base portion 98 thereof effects a movement towards the reservoir bottom 46 or away therefrom, wherein the rolling lobe bellows 54 may roll over the cylindrical reservoir wall 48 of the housing 44.

In comparison to conventional concertina-type bellows, use of the rolling lobe bellows 54 not only makes for easier movability of the base portion 98 with the substantially liquid-tight but air-permeable connection 64 to the atmosphere provided therein, but also provides a greater stroke capacity of the base portion 98, such that the rolling lobe bellows 54 may also follow relatively large volume fluctuations in the expansion reservoir 12 without difficulty.

As already mentioned above, the above-described extension 66 of the hydraulic connection 62 to the clutch master cylinder 16 provides a simple and reliable way of preventing air left in the filled expansion reservoir 12 from migrating into the clutch master cylinder 16 in the event of rotation of the hydraulic clutch control 10 installed in the motor vehicle.

In accordance with respective requirements, the two measures—rolling lobe bellows 54 on the one hand and extension 66 on the other hand—may be used together or the extension 55 may be used on its own, to provide a functionally improved expansion reservoir 12.

An expansion reservoir is disclosed, which has a fluid chamber defined by a reservoir bottom and a flexible reservoir top movable relative to the reservoir bottom as a function of the reservoir filling level, wherein a hydraulic connection to a master cylinder is provided at the reservoir bottom while the reservoir top comprises a substantially liquid-tight but air-permeable connection to the atmosphere, in order to allow pressure compensation between an air volume left in the filled fluid chamber and the atmosphere. According to the invention, the hydraulic connection to the master cylinder comprises an extension protruding into the fluid chamber, which extension defines a predetermined volume in the fluid chamber which is larger than the air volume left in the filled fluid chamber. In addition thereto, the reservoir top may take the form of a rolling lobe bellows, which comprises a plurality of wall portions substantially concentric at least in the undeformed state. As a result, an expansion reservoir is provided which is functionally improved relative to the prior art.

I claim:

1. An expansion reservoir for a master cylinder of a hydraulic force transmission system, the reservoir having a fluid chamber defined by a reservoir bottom and a flexible reservoir top which may be moved towards the reservoir bottom or away therefrom as a function of a filling level of the reservoir, wherein a hydraulic connection to the master cylinder is provided at the reservoir bottom while the reservoir top comprises a substantially liquid-tight but air-permeable connection to the atmosphere in order to allow pressure compensation between an air volume left in the fluid chamber when the force transmission system is in the filled state and the atmosphere, wherein the hydraulic connection to the master cylinder comprises an extension protruding into the fluid chamber, which extension defines a predetermined volume in the fluid chamber which is larger than the volume of air left in the fluid chamber when the force transmission system is in the filled state, and wherein the extension is constructed in one piece with the reservoir bottom and is preferably injection-molded from plastics material.

2. An expansion reservoir according to claim 1, wherein the extension is provided substantially centrally on the reservoir bottom.

3. An expansion reservoir according to claim 1, wherein the extension is tubular.

4. An expansion reservoir according to claim 1, wherein the flexible reservoir top takes the form of a rolling lobe bellows comprising a plurality of wall portions which are substantially concentric at least in an undeformed state.

5. An expansion reservoir according to claim 4, wherein the rolling lobe bellows rolls over a cylindrical side wall of the expansion reservoir when it moves towards the reservoir bottom or away therefrom.

6. An expansion reservoir according to claim 4, wherein the rolling lobe bellows comprises an annular fastening flange, which is gripped between a side wall of the expansion reservoir and a cover attached detachably to the expansion reservoir.

7. An expansion reservoir according to claim 6, wherein the fastening flange is provided with two annular, concentric inner and outer sealing beads, wherein the inner sealing bead has a diameter which is smaller than an average diameter of the side wall, while the outer sealing bead has a diameter which is larger than the average diameter of the side wall.

8. An expansion reservoir according to claim 7, wherein the scaling beads are provided an the side of the fastening flange remote from the reservoir bottom.

9. An expansion reservoir according to claim 4, wherein the rolling lobe bellows has three resiliently interconnected wall portions in the form of two inner wall portions and one outer wall portion, wherein the inner two wall portions exhibit a wall thickness which is smaller than the wall thickness of the outer wall portion.

10. An expansion reservoir according to claim 4, wherein the rolling lobe bellows has a base portion extending substantially perpendicularly to the wall portions, which base portion comprises a central opening, into which a valve element is detachably hooked which serves in providing the substantially liquid-tight but air-permeable connection to the atmosphere.

11. An expansion reservoir according to claim 1, wherein the expansion reservoir is constructed separately from a housing of the master cylinder.

12. An expansion reservoir according to claim 1, wherein the hydraulic force transmission system is a hydraulic clutch control.

13. An expansion reservoir according to claim 1, wherein the hydraulic force transmission system is a hydraulic brake system.

14. An expansion reservoir for a master cylinder of a hydraulic force transmission system, the reservoir having a fluid chamber defined by a reservoir bottom and a flexible reservoir top which may be moved towards the reservoir bottom or away therefrom as a function of a filling level of the reservoir, wherein a hydraulic connection to the master cylinder is provided a the reservoir bottom while the reservoir top comprises a substantially liquid-tight but air-permeable connection to the atmosphere in order to allow pressure compensation between an air volume left in the fluid chamber when the force transmission system is in the filled state and the atmosphere, wherein the hydraulic connection to the master cylinder comprises an extension protruding into the fluid chanter, which extension defines a predetermined volume in the fluid chamber which is larger than the volume of air left in the fluid chamber when the force transmission system is in the filled state, wherein the flexible reservoir top takes the form of a rolling lobe bellows comprising a plurality of wall portions which are substantially concentric at least in an undeformed state, and wherein the rolling lobe bellows has three resiliently interconnected wall portions in the form of two inner wall portions and one outer wall portion, wherein the inner two wall portions exhibit a wall thickness which is smaller than the wall thickness of the outer wall portion.

15. An expansion reservoir according to claim 14, wherein the rolling lobe bellows rolls over a cylindrical side wall of the expansion reservoir when it moves towards the reservoir bottom or away therefrom.

16. An expansion reservoir according to claim 14, wherein the rolling lobe bellows comprises an annular fastening flange, which is gripped between a side wall of the expansion reservoir and a cover attached detachably to the expansion reservoir.

17. An expansion reservoir according to claim 16, wherein the fastening flange is provided with two annular, concentric inner and outer sealing beads, wherein the inner sealing bead has a diameter which is smaller than an avenge diameter of the side wall, while the outer scaling bead has a diameter which is larger than the average diameter of the side wall.

18. An expansion reservoir according to claim 17, wherein the sealing beads are provided on the side of the fastening flange remote from the reservoir bottom.

19. An expansion reservoir according to claim 14, wherein the rolling lobe bellows has a base portion extending substantially perpendicularly to the wall portions, which base portion comprises a central opening, into which a valve element is detachably hooked which serves in providing the substantially liquid-tight but air permeable connection to the atmosphere.

20. An expansion reservoir according to claim 14, wherein the expansion reservoir is constructed separately from a housing of the master cylinder.

21. An expansion reservoir according to claim 14, wherein the hydraulic force transmission system is a hydraulic clutch control.

22. An expansion reservoir according to claim 14, wherein the hydraulic force transmission system is a hydraulic brake system.

* * * * *